United States Patent Office 2,694,587
Patented Nov. 16, 1954

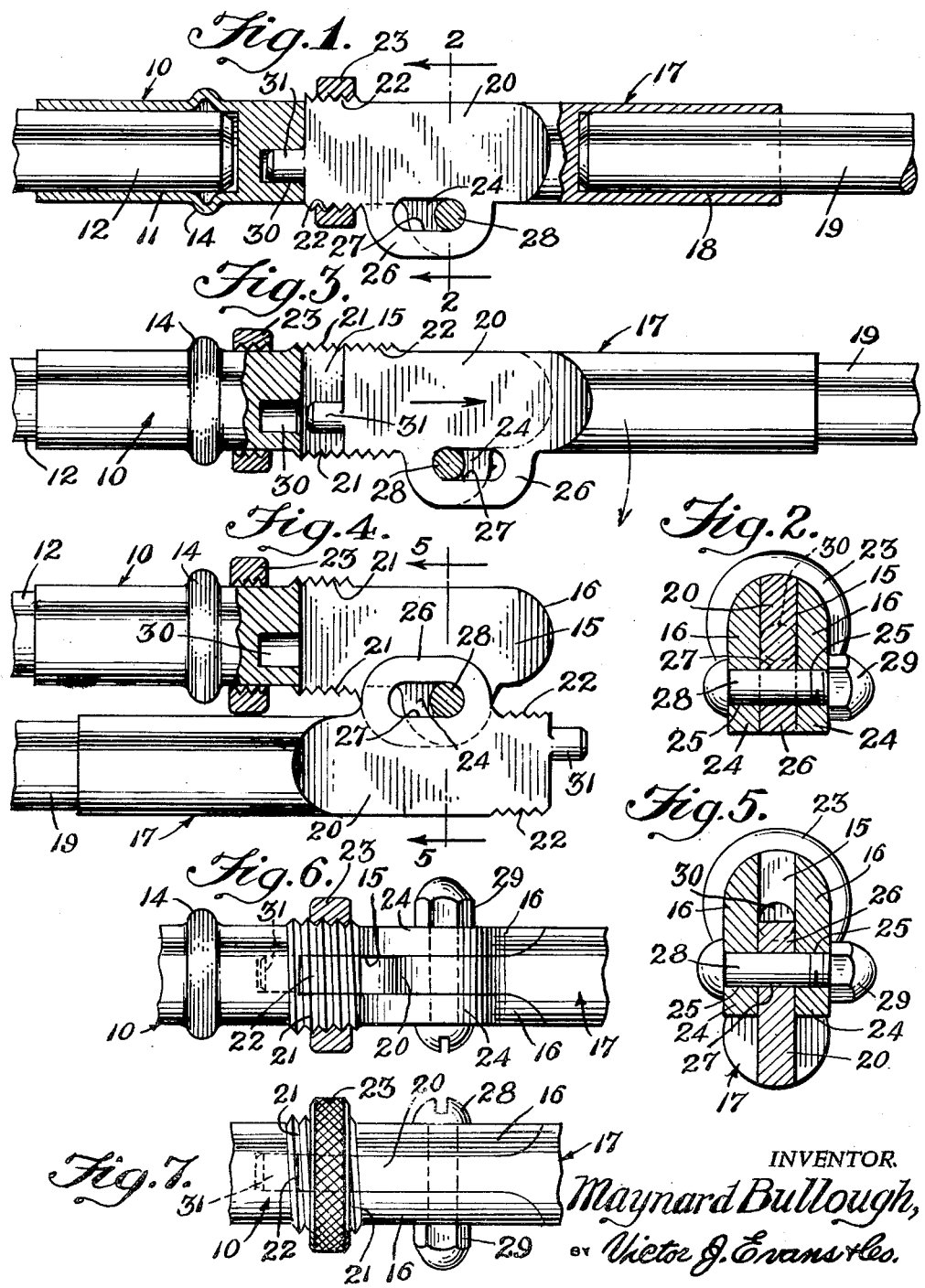

2,694,587
FISHING ROD FERRULE

Maynard Bullough, Ogden, Utah

Application May 11, 1953, Serial No. 354,283

1 Claim. (Cl. 287—99)

This invention relates to a fishing rod ferrule.

This invention is an improvement over the fishing rod ferrule shown and described in my Patent No. 1,893,396.

The object of the invention is to provide a fishing rod ferrule which will maintain the sections of a fishing rod locked in extended position when the rod is being used, and wherein the fishing rod can be readily moved to a collapsed position to occupy a minimum amount of space for storage or shipment.

Another object of the invention is to provide a ferrule which will permit sections of a rod to be locked in extended position or folded to provide a small unit, the ferrule permitting the sections of the rod to be swung together.

A further object of the invention is to provide a fishing rod ferrule which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the fishing rod ferrule, with the rod sections in extended position and locked together, and with parts broken away and in section.

Figure 2 is a sectional view taken on the line 2—2 of Figure 1.

Figure 3 is a view similar to Figure 1, but showing the parts in unlocked position.

Figure 4 is a view similar to Figure 1, but showing the rod sections in folded position.

Figure 5 is a sectional view taken on the line 5—5 of Figure 4.

Figure 6 is a bottom plan view showing the rod sections in extended locked position.

Figure 7 is a top plan view showing the sections in locked extended position.

Referring in detail to the drawings, the numeral 10 designates a body member which may be fabricated of any suitable material, and the body member 10 is provided with a socket 11 for receiving an end of a fishing rod section 12. The body member 10 may be provided with an annular shoulder 14, and the body member 10 is also provided with a cut-out or groove 15 which defines a pair of spaced parallel legs 16.

The ferrule of the present invention further includes a support member 17 which is provided with a socket 18 for snugly receiving therein an end of a second section 19 of a fishing rod. A tongue 20 extends from an end of the support member 17, and the tongue 20 is adapted to be moved into and out of the groove 15 between the legs 16 as shown in the drawings.

A portion of the outer surface of each of the legs 16 is provided with threads 21, and a portion of the tongue 20 is also provided with threads 22. A knurled collar 23 is provided with interior threads, and the collar 23 is adapted to be arranged in engagement with the threaded portions 21 and 22 in order to lock the body member and support member in their aligned end to end relation or position.

Formed integral with each of the legs 16 or secured thereto is an ear 24, and each of the ears 24 is provided with a hole 25 which may be taper drilled and tapped. A lug 26 is formed integral with or secured to the tongue 20, and the lug 26 is provided with a slot 27 which is adapted to register with the hole 25, there being a suitable securing element such as a tapered threaded screw 28 extending through the hole 25 and slot 27. A nut 29 may be arranged in threaded engagement with an end of the screw 28.

The body member 10 is further provided with a recess 30 which communicates with the groove 15, and the recess 30 is adapted to snugly receive therein a locking pin 31 which extends from an end of the tongue 20, when the sections of the fishing rod are to be locked in extended position.

From the foregoing it is apparent that a ferrule has been provided which will effectively lock the sections 12 and 19 of a fishing rod or other rod in their extended position as shown in Figures 1 and 2. Thus, as shown in Figure 1 the collar 23 is arranged in threaded engagement with the threaded portions 21 of the legs 16 and also with the threaded portion 22 of the tongue 20. Further, the pin 31 is snugly seated in the recess 30 so that the body member 10 and support member 17 will be locked in alignment whereby the fishing rod can be used in the normal manner. When the fishing rod is not being used as when it is to be stored in a small space, the knurled collar 23 can be rotated to disengage the collar 23 from the threaded portions 21 and 22 so that the collar 23 moves to the position shown in Figure 3. At the same time the support member 17 and body member 10 are separated so that the pin 31 moves from the recess 30. Then, the support member 17 can be swung or pivoted about the pin or bolt 28 so that the support member 17 and body member 10 are in a position of side by side relationship as shown in Figure 4. Thus, the body member and support member can be readily moved to and from extended or collapsed position.

Furthermore, it will be seen that there is provided a double lock which comprises the knurled collar 23 and the pin 31, and there is also provided a sliding hinge construction.

I claim:

A fishing rod ferrule comprising a body member provided with a socket for receiving an end of a fishing rod section, there being a cutout in said body member defining a pair of spaced parallel legs, a support member provided with a socket for snugly receiving therein an end of a second section of a fishing rod, a tongue extending from an end of said support member and adapted to be moved into and out of the cutout between said pair of legs, a portion of the outer surface of said legs being provided with threads, a portion of said tongue having threads thereon, a knurled collar provided with interior threads adapted to be arranged in engagement with the threaded portion of said tongue and legs for maintaining the body member and support member in their aligned end to end position, an ear projecting from each of said legs and provided with a hole, a lug secured to said tongue and provided with a slot adapted to register with said holes, a securing element extending through said slot and holes, a locking pin extending from an end of said tongue, said body member being provided with a recess communicating with the cutout between said legs, said recess adapted to receive said locking pin when the sections of the fishing rod are in aligned end to end relation.

References Cited in the file of this patent
UNITED STATES PATENTS

| Number | Name | Date |
| --- | --- | --- |
| 561,665 | Hubbell | June 9, 1896 |
| 646,347 | Betty | Mar. 27, 1900 |
| 1,039,868 | Whitney | Oct. 1, 1912 |
| 1,893,396 | Bullough | Jan. 3, 1933 |
| 2,135,487 | Askue | Nov. 8, 1938 |